United States Patent
Park

(10) Patent No.: US 7,852,423 B2
(45) Date of Patent: Dec. 14, 2010

(54) LIQUID CRYSTAL DISPLAY DEVICE WITH HEAT DISSIPATION ON THE PRINTED CIRCUIT BOARD

(75) Inventor: Won Yong Park, Kyongsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 509 days.

(21) Appl. No.: 11/022,763

(22) Filed: Dec. 28, 2004

(65) Prior Publication Data

US 2005/0219438 A1   Oct. 6, 2005

(30) Foreign Application Priority Data

Mar. 30, 2004   (KR) .................. 10-2004-0021627

(51) Int. Cl.
*G02F 1/1333* (2006.01)
*G02F 1/1335* (2006.01)
*G02F 1/1345* (2006.01)

(52) U.S. Cl. .................. 349/58; 349/61; 349/62; 349/63; 349/65; 349/149; 349/150; 349/151; 349/152

(58) Field of Classification Search ............... 349/58, 349/61–63, 65, 149–151; 361/681
See application file for complete search history.

(56) References Cited

U.S. PATENT DOCUMENTS

| | | | |
|---|---|---|---|
| 6,020,867 A * | 2/2000 | Shimada et al. | 345/87 |
| 6,330,150 B1 * | 12/2001 | Kim | 361/683 |
| 6,532,152 B1 * | 3/2003 | White et al. | 361/692 |
| 6,661,480 B2 * | 12/2003 | Fujishiro et al. | 362/600 |
| 6,924,855 B2 * | 8/2005 | Chung | 349/58 |
| 7,116,386 B2 * | 10/2006 | Lee et al. | 349/58 |
| 7,226,196 B2 * | 6/2007 | Parker et al. | 362/606 |
| 2001/0024250 A1 * | 9/2001 | Fujishiro et al. | 349/65 |
| 2002/0030771 A1 | 3/2002 | Kim | |
| 2002/0186333 A1 * | 12/2002 | Ha et al. | 349/58 |
| 2002/0187806 A1 * | 12/2002 | Jang | 455/556 |

FOREIGN PATENT DOCUMENTS

DE   199 39 106   4/2001

* cited by examiner

*Primary Examiner*—Hoan C Nguyen
(74) *Attorney, Agent, or Firm*—Morgan, Lewis & Bockius LLP

(57) ABSTRACT

A liquid crystal display device includes a main support supporting a liquid crystal panel and a back light unit, a printed circuit board attached to the liquid crystal panel to provide driving signals to the liquid crystal panel, a separation part between the printed circuit board and the main support creating a gap therebetween, and a holder holding the printed circuit board and the main support together.

8 Claims, 3 Drawing Sheets

LIQUID CRYSTAL DISPLAY DEVICE WITH HEAT DISSIPATION ON THE PRINTED CIRCUIT BOARD

This application claims the benefit of the Korean Application No. P2004-021627 filed on Mar. 30, 2004, which are hereby incorporated by reference.

BACKGROUND OF THE INVENTION

1. Field of the Invention

The present invention relates to liquid crystal display (LCD) devices, and more particularly, to an LCD device which is capable of preventing degradation of the device.

2. Background of the Related Art

Among various of flat displays, the LCD device is in great demand because of great contrast ratio, small power consumption, and suitability for displaying gradation and moving pictures. The LCD device is usually provided with an LCD Module (LCM) and a driving circuit unit for driving the LCD module. The LCD module has a liquid crystal panel unit with switching devices for switching signals provided to a matrix of liquid crystal cells injected between two sheets of glass, and a back light unit for directing light to the liquid crystal panel unit.

The liquid crystal panel unit and the back light unit are held together as one unit and protected with a case from an external impact. The driving circuit unit is mounted on a printed circuit board (PCB) to drive the liquid crystal panel unit. A tape carrier package (TCP) is used for signal transmission between the liquid crystal panel unit and the PCB. The TCP is structured such that single or multiple metallic conductive layers are inserted between soft material layers, for example, polyamide layers or the like.

A related art LCD device will be described with reference to the attached drawings. FIG. 1 schematically illustrates a disassembled perspective view of a related art LCD module. FIG. 2 schematically illustrates a back view of the related art LCD device of FIG. 1. FIG. 3 schematically illustrates a cross-sectional view taken along a line I-I' in FIG. 2.

As shown in FIG. 1, an LCD module 10 is provided with a liquid crystal panel unit 11 and a back light unit 12, which are held together with a main support 13 and a top case 20. Although not shown, all of the above units are placed in and fastened to a bottom case. The main support 13 is a mold of plastic material for accommodating the back light unit 12 and the liquid crystal panel unit 11. The back light unit 12 includes a lamp 25, a reflective plate 12a, a light guide plate 12b and optical sheets 12c-12e. The liquid crystal panel unit 11 includes top and bottom substrates 11c and 11d bonded opposite to each other, and polarization plates 11a and 11b sandwiching the top and bottom substrates 11c and 11d.

The optical sheets 12c-12e of the back light unit 12 represent a diffuser sheet 12c, a prism sheet 12d and a protection sheet 12e, respectively. The top substrate 11c of the liquid crystal panel unit 11 is provided with a color filter layer for displaying colors. The bottom substrate 11d of the liquid crystal panel unit 11 is provided with thin film transistors as switching devices for turning on/off a voltage. Therefore, light from the lamp 25 is lead through the light guide plate 12b, passes through the optical sheets 12c-12e in succession, and reaches to the liquid crystal panel unit 11 on which picture information is displayed.

The picture information is received from a driving circuit unit, which includes printed circuit boards 40a and 40b attached to the bottom substrate 11d of the liquid crystal panel unit 11. As shown in FIG. 2, the printed circuit boards 40a and 40b are mounted to a back of the main support 13. The printed circuit boards 40a and 40b each have a drive integrated circuit (IC) for driving the switching devices (the TFT array). Specifically, the printed circuit board 40a represents a data printed circuit board having a data drive IC mounted thereon, and the printed circuit board 40b represents a gate printed circuit board having a gate drive IC mounted thereon. As shown in FIGS. 2 and 3, the data printed circuit board 40a is also provided with a timing controller (not shown) for controlling a data drive signal, a power supplying unit 50 for supplying power for various signals, and a connector 60 for connection to an external power source. The printed circuit boards 40a and 40b are electrically connected to the liquid crystal panel unit 11 via tape carrier packages 41a and 41b, to transmit control signals and video signals from the drive ICs to the LCD module 10.

Next, an assembly process of the LCD device will be described with reference to FIGS. 1 and 3.

As shown in FIG. 3, the back light unit 12 is arranged inside the main support 13 by stacking the lamp 25, the reflective plate 12a, the light guide plate 12b, and the optical sheets 12c-12e in succession. The liquid crystal panel unit 11 has the polarization plates 11a and 11b to sandwich the top and bottom substrates 11c and 11d. Also, the liquid crystal panel unit 11 is seated on a step of the main support 13 to be spaced a distance from the back light unit 12. Then, the tape carrier packages 41a and 41b attached to the bottom substrate 11d of the liquid crystal panel unit 11 are folded to surround a lower edge of the main support 13. Thus, the printed circuit boards 40a and 40b are arranged on the back of the main support 13.

By supplying power to the LCD device through the connector 60 of FIG. 2, and turning on the lamp 25, the LCD device is driven but is liable to degrade due to heat from the power supply part 50 of FIG. 2. In order to prevent the LCD device from being degraded, as shown in FIG. 2, a conductive tape 70 is provided between a part of the printed circuit board 40a where the heat is generated and the liquid crystal module 10. Specifically, as shown in FIG. 3, the conductive tape 70 is arranged between the printed circuit board 40a and the main support 13. The conductive tape 70, a conductive aluminum film, is attached to the printed circuit board 40a.

However, the related art LCD device has at least the following problem. When the printed circuit board is provided to the back of the LCD module, heat from the power supply unit and the like affects the liquid crystal layer and the polarization plates, thereby causing degradation of the LCD module.

In order to resolve the problem of degradation of the device, a conductive tape is inserted between the part of the printed circuit board having the heat emitted therefrom and the LCD module, to disperse the heat. However, since the conductive tape is attached manually, there are many defects of the attachment depending on working states of the attachment of the workers. Further, since such a conductive tape may transfer the heat directly to the LCD module, the heat cannot be efficiently dispersed to the outside of the LCD device.

SUMMARY OF THE INVENTION

Accordingly, the present invention is directed to an LCD device that substantially obviates one or more of the problems due to limitations and disadvantages of the related art.

An object of the present invention is to provide an LCD device that prevents degradation of the LCD device.

Another object of the present invention is to provide an LCD device that efficiently disperses heat from the LCD device.

Additional features and advantages of the invention will be set forth in the description which follows, and in part will be apparent to those having ordinary skill in the art upon examination of the following or may be learned from practice of the invention. The objectives and other advantages of the invention will be realized and attained by the structure particularly pointed out in the written description and claims hereof as well as the appended drawings.

To achieve these objects and other advantages and in accordance with the purpose of the present invention, as embodied and broadly described herein, a liquid crystal display (LCD) device includes a liquid crystal panel, a back light unit, a main support supporting the liquid crystal panel and the back light unit, a printed circuit board attached to the liquid crystal panel to provide driving signals to the liquid crystal panel, a separation part arranged between the printed circuit board and the main support and creating a gap therebetween to dissipate heat from the printed circuit board, and a holder to hold the printed circuit board and the main support together.

In another aspect, a process for fabricating a liquid crystal display (LCD) device comprises arranging a liquid crystal panel and a back light unit in a main support, forming a separation part on one of a printed circuit board and the main support to dissipate heat generated from the printed circuit board, attaching the printed circuit board to the main support such that a gap between the printed circuit board and the main support is created by the separation part, and providing a holder to hold the printed circuit board and the main support together.

It is to be understood that both the foregoing description and the following detailed description of the present invention are exemplary and explanatory and are intended to provide further explanation of the invention claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
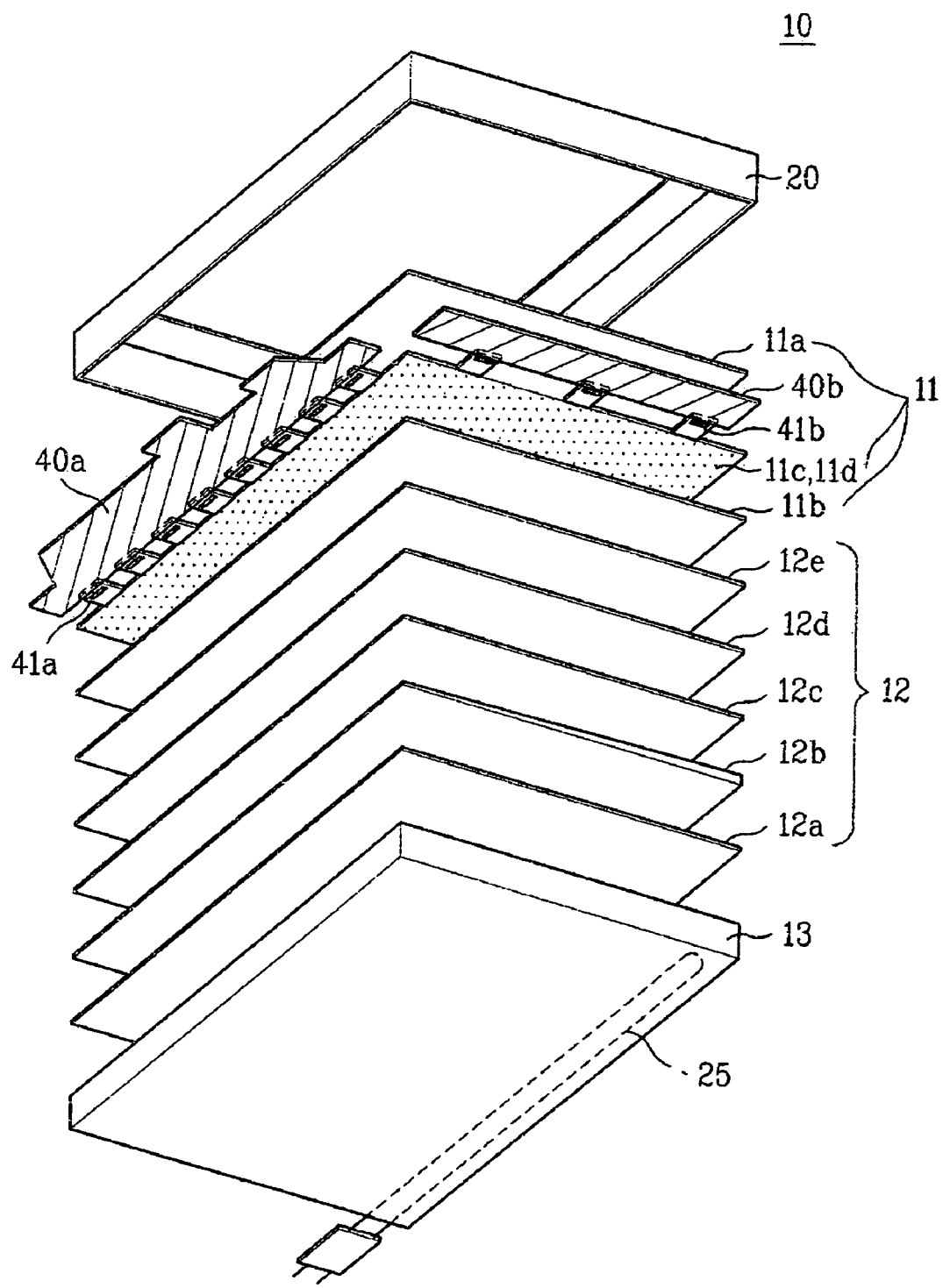
FIG. 1 schematically illustrates a disassembled perspective view of a related art LCD module.
Figure 2:
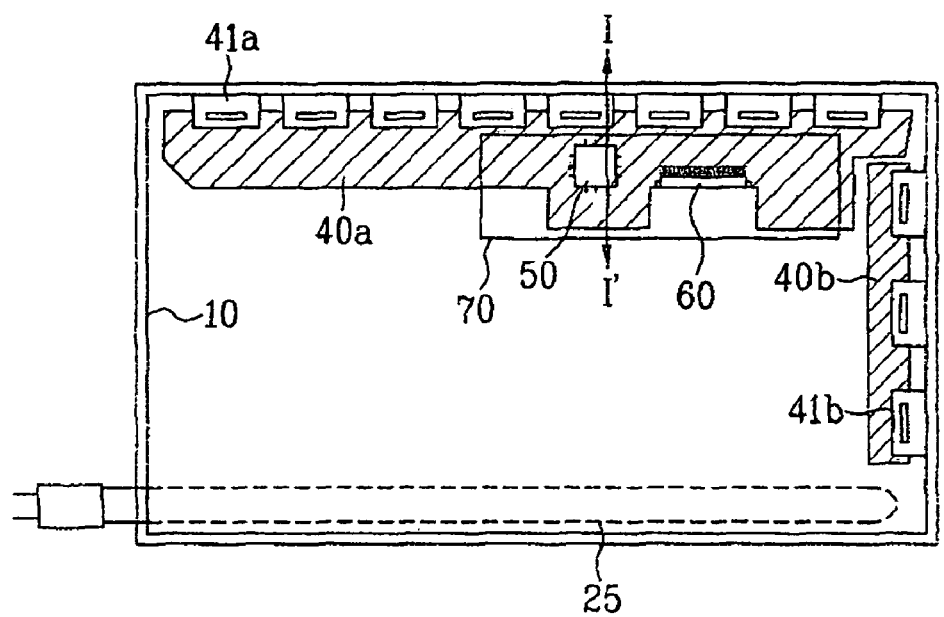
FIG. 2 schematically illustrates a back view of the related art LCD device of FIG. 1.
Figure 3:
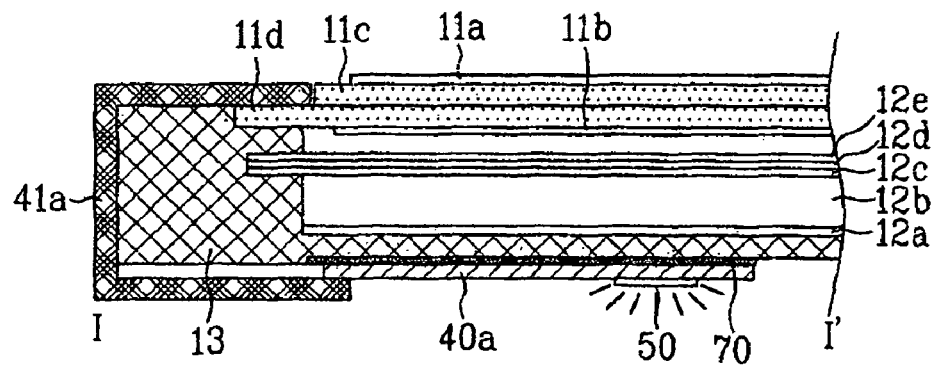
FIG. 3 schematically illustrates a cross-sectional view taken along line I-I' in FIG. 2.
Figure 4:
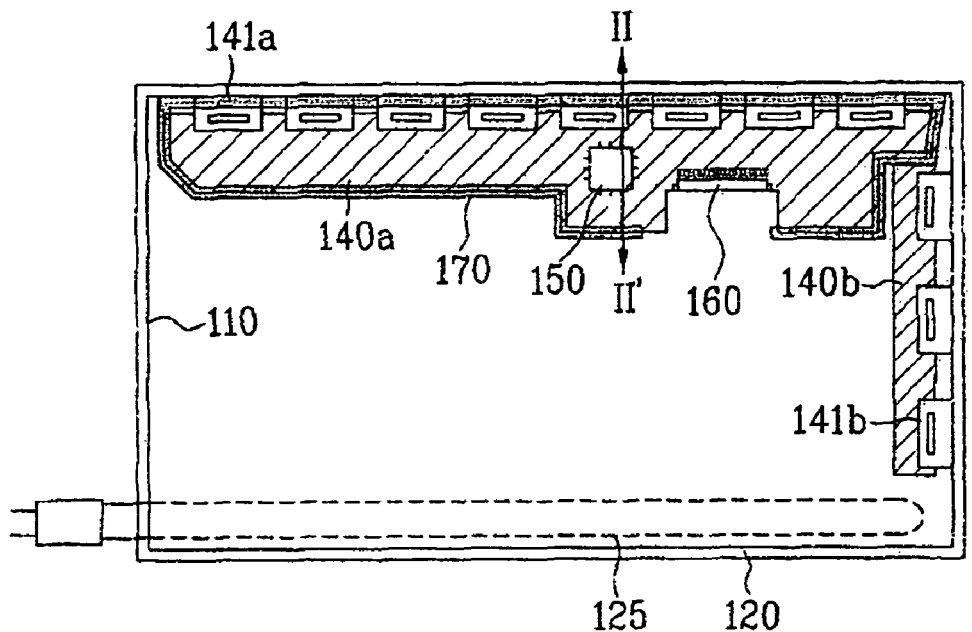
FIG. 4 schematically illustrates a back view of an LCD device according to an exemplary embodiment of the present invention.
Figure 5:
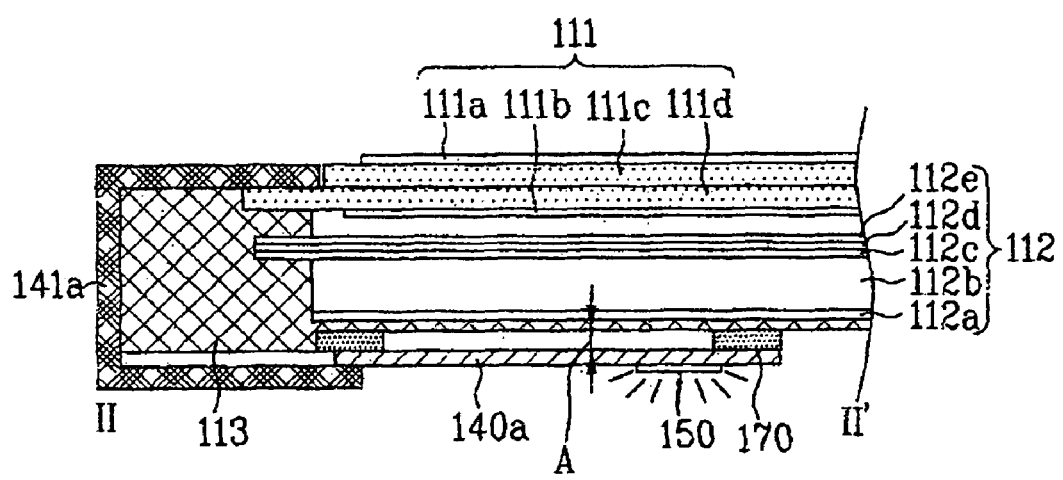
FIG. 5 schematically illustrates a cross-sectional view of the LCD device across a line II-II' in FIG. 4.

FIG. 4 schematically illustrates a back view of an LCD device according to an exemplary embodiment of the present invention. FIG. 5 schematically illustrates a cross-sectional view of the LCD device taken along a line II-II' in FIG. 4.

As shown in FIG. 4, the LCD device includes an LCD module (LCM) 110, printed circuit boards 140a and 140b, and a separation part 170 between the LCD module 110 and the printed circuit board 140a to create a space or gap therebetween for dissipation of heat. As shown in FIG. 5, the LCD module 110 includes a liquid crystal panel unit 111 and a back light unit 112 supported by a main support 113. The main support may be formed of, for example, a plastic material in this embodiment of the present invention. The printed circuit board 140a is attached to a back of the LCD module 110. The printed circuit board 140a is fastened to the main support 113 by means of a holder (not shown).

Also, the liquid crystal panel unit 111 includes a color filter substrate 111c having a color filter layer for displaying colors, a TFT array substrate 111d bonded opposite to the color filter substrate 111c, a liquid crystal layer sealed between the two substrates 111c and 111d, and polarization plates 111a and 111d sandwiching the two substrates 111c and 111d to convert natural light into polarized light. Further, the liquid crystal panel unit 111 is connected to the printed circuit boards 140a and 140b to display a picture in response to various external signals. The TFT array substrate 111d includes gate lines and data lines perpendicular to each other to define pixels and to provide various signals to the pixels, and thin film transistors TFT to selectively apply a signal to the pixels.

The back light unit 112 includes at least one lamp 125, a reflective plate 112a arranged under the lamp 125 for directing light from the lamp 125 to a display part of the liquid crystal panel unit 111, a light guide plate 112b on the reflective plate 112a for controlling quantity and direction of the light from the lamp 125 and converting linear light into planar light, and optical sheets over the lamp 125 and the light guide plate 112b. The optical sheets in this embodiment include a diffuser sheet 112c, a prism sheet 112d, a protection sheet 112e, for transmitting the light from the lamp 125 to the liquid crystal panel unit 111. In addition, the back light unit 112 may have a variety of types depending on methods of light projection, such as from a direct type to a light guide plate type.

The liquid crystal panel unit 111 and the back light unit 112 are mounted inside the main support 113 in succession. A top case (not shown) of stainless steel surrounds and is attached to, an edge (a region excluding the display region) of the liquid crystal panel unit 111.

The printed circuit board 140a represent a data printed circuit board. The printed circuit board 140b represents a gate printed circuit board. The printed circuit boards 140a and 140b are connected to the TFT array substrate 111d of the liquid crystal panel unit 111 via tape carrier packages 141a and 141b. The gate printed circuit board 140b has a gate drive integrated circuit (IC) mounted thereon, for driving the gate lines in the liquid crystal panel unit 111. The data printed circuit board 140a has a data drive integrated circuit (IC) mounted thereon for driving the data lines in the liquid crystal panel unit 111. Though the gate and data drive ICs may be mounted on inside surfaces of the printed circuit boards 140a and 140b and face the back of the LCD module 110, it is preferable to mount the drive ICs on outside surfaces of the printed circuit boards 140a and 140b according to an embodiment of the present invention. In other words, when the drive ICs are mounted on the inside surfaces of the printed circuit boards 140a and 140b, the printed circuit boards 140a and 140b may be apart from the LCD module 110.

The data printed circuit board 140a further includes a timing control part for controlling various signals, and a power supplying part 150 for generating driving voltages, such as a common voltage Vcom, a gate high voltage Vgh, a gate low voltage Vgl, required for the LCD device, by using power received via the connector 160. Since the power supplying part 150 generates various signals in response to an external power, the power supplying part 150 generates heat while driving the LCD device. The heat generated in the vicinity of the power supply part 150 can degrade at least the liquid crystal layer and the polarizing plates of the LCD module, and therefore, heat should preferably be dissipated from the LCD device.

Accordingly, as shown in FIGS. 4 and 5, the separation part 170 is provided between the LCD module 110 (particularly, the main support 113) and the data printed circuit board 140a, such that the LCD module 110 is spaced a distance apart from the data printed circuit board 140a, thereby creating a space 'A' to dissipate the heat. The separation part 170 may, or may not be provided to an entire edge of the data printed circuit board 140a. The separation part 170 may or may not be formed as one unit with a fastening part for fastening the printed circuit boards 140a and 140b to the LCD module. According to such an arrangement of this embodiment, the heat from the printed circuit boards 140a and 140b can be prevented from directly transferring to the LCD module 110, and further can be dissipated to an outside of the LCD device through the space 'A'. The degradation of the LCD device is thus resolved.

The LCD device displays a picture by supplying a scanning signal to the gate lines connected to the gate printed circuit board 140b so that the pixels are driven line by line in succession, and supplying a pixel voltage signal to the data lines connected to the data printed circuit board 140a every time the scanning signal is provided to one of the gate lines, and controlling an optical transmission by means of an electric field applied between pixel electrode and common electrode in response to the pixel voltage signal.

As has been described above, the LCD device according to the embodiment of the present invention has the following advantages. That is, the separation part between edges of the printed circuit board and the LCD module, in particular, between the printed circuit board and the bottom part of the main support, creates a space via which the heat from the printed circuit board can be prevented from directly transmitting to the LCD module and further can be dissipated to the outside of the LCD device. As a result, the degradation of the liquid crystal layer and the polarization plates of the LCD device is thus resolved.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display (LCD) device, comprising:
   a liquid crystal panel;
   a backlight unit;
   a main support supporting the liquid crystal panel and the back light unit;
   a data printed circuit board attached to the liquid crystal panel to provide driving signals to the liquid crystal panel using power received by a connector formed on the edge of the printed circuit board, wherein the connector is connected to a external power source;
   a gate printed circuit board for driving gate lines in the liquid crystal panel;
   a separation part arranged between the data printed circuit board and a main support and creating a space therebetween to dissipate heat from the data printed circuit board, wherein the one part of the separation part is in direct contact with the main support and the other part of the separation part is in direct contact with the data printed circuit board, and wherein the contact surface between the main support and the one part of the separation part faces the contact surface between the data printed circuit board and the other part of the separation part, and wherein the separation part is formed as a single unit on an entire edge of the data printed circuit board; and
   at least a tape carrier package to electrically connect the liquid crystal panel to the data printed circuit board, wherein an edge of the separation part protrudes toward the tape carrier package further than the edge of the data printed circuit board, and wherein the edge of the separation part is not in contact with the space.

2. The LCD device as claimed in claim 1, wherein the separation part is formed of plastic.

3. The LCD device as claimed in claim 1, wherein the separation part is arranged on a rear surface of the main support.

4. The LCD device as claimed in claim 1, wherein at least an integrated circuit is provided to an outside surface of the data printed circuit board.

5. A process for fabricating a liquid crystal display (LCD) device, comprising:
   arranging a liquid crystal panel and a back light unit in a main support, wherein the liquid crystal panel and the back light unit are supported by the main support;
   forming a separation part on one of a data printed circuit board and the main support and creating a space therebetween to dissipate heat generated from the data printed circuit board which has a connector formed on the edge of the data printed circuit board, wherein the connector is connected to an external power source;
   foaming a gate printed circuit board for driving gate lines in the liquid crystal panel;
   attaching the data printed circuit board to the main support such that a gap between the data printed circuit and the main support is created by the separation part, wherein the one part of the separation part is in direct contact with the main support and the other part of the separation part is in direct contact with the data printed circuit board, and wherein the contact surface between the main support and the one part of the separation part faces the contact surface between the data printed circuit board and the other part of the separation part, and wherein the separation part is formed as a single unit on an entire edge of the data printed circuit board; and
   forming at least a tape carrier package to electrically connect the liquid crystal panel to the data printed circuit board, wherein an edge of the separation part protrudes toward the tape carrier package further than the edge of the data printed circuit board, and wherein the edge of the separation part is not in contact with the gap.

6. The process as claimed in claim 5, wherein the separation part is formed of plastic.

7. The process as claimed in claim 5, further comprising forming at least an integrated circuit on an outside surface of the data printed circuit board.

8. The process as claimed in claim 5, wherein the separation part is formed on a rear surface of the main support.

* * * * *